INVENTOR.
CHARLES C. HILL

June 21, 1966  C. C. HILL  3,256,688
CONTROLLED COMBUSTION OF SOLID PROPELLANTS
Filed Nov. 24, 1961  2 Sheets-Sheet 2

INVENTOR.
CHARLES C. HILL
BY
Barnes, Kisselle, Laisch & Choate
ATTORNEYS

United States Patent Office 3,256,688
Patented June 21, 1966

3,256,688
CONTROLLED COMBUSTION OF SOLID
PROPELLANTS
Charles C. Hill, 1148 Vesper Ave., Ann Arbor, Mich.
Filed Nov. 24, 1961, Ser. No. 154,582
7 Claims. (Cl. 60—39.03)

This invention relates to the combustion of solid propellants and particularly to a method and apparatus for controlling the combustion of solid propellants such as are used in propelling rockets and missiles or in providing power for actuating components thereof.

At the present time, solid propellants usually comprise a mixture of a solid fuel and a solid oxidant, in a mass capable of being ignited and thereafter burned at a substantially steady rate to provide combustion gases which are used either for propelling a rocket or missile or for actuating certain components thereof.

It is an object of this invention to provide a method and apparatus for modulating, controlling and terminating the combustion of solid propellants as may be desired.

It is a further object of the invention to provide such a method and apparatus which will effectively control the rate or magnitude of combustion of such propellants.

Basically, the invention comprises passing a gas through a powdered mass of solid propellant to fluidize the solid propellant and thereafter directing the fluidized propellant under the pressure of the gas into a combustion chamber which is preferably cylindrical, the fluidized propellant being directed tangentially into the chamber and being ignited therein and recirculated until finally consumed so that the combustion products are permitted to pass out of the chamber through axial openings in the chamber.

Figure 1:
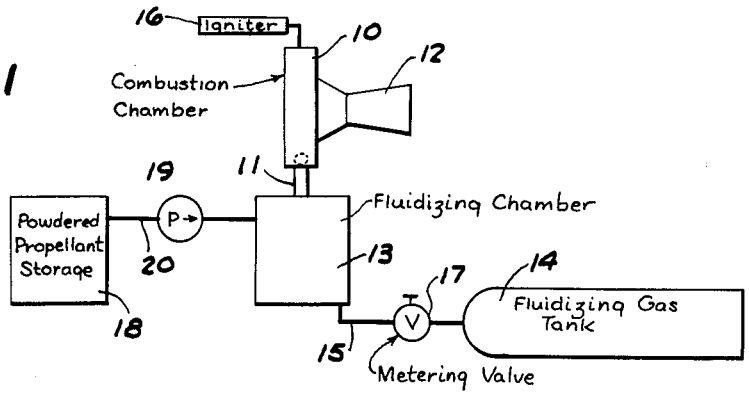
FIG. 1 is a diagrammatic view of an apparatus for controlling the combustion of solid propellants in accordance with the present invention.

Referring to FIG. 1, cylindrical combustion chamber 10 is provided with a tangential inlet 11 and an axial outlet 12. Tangential inlet 11 is connected to a fluidizing chamber 13 which is adapted to contain a solid propellant comprising a mixture of solid fuel and solid oxidant in loose particle form. Gas under pressure from a container 14 is directed to the fluidizing chamber 13 through a line 15. The gas serves to fluidize or suspend the powdered solid propellant in the fluidizing chamber 13 so that it is carried through the inlet 11 to the combustion chamber 10. In the combustion chamber 10 the fluidized propellant is initially ignited by an igniter 16 placed in the path of the fluidized propellant. After initial combustion, the solid propellant is recirculated in the chamber 10 so that subsequent fluidized propellant entering the chamber is ignited by the propellant already burning. After the solid propellant is burned in chamber 10, the combustion gases pass axially out of the combustion chamber 10 through axial outlet 12.

A metering valve 17 in the line 15 controls the amount of gas passing through the fluidizing chamber and thereby controls the rate and amount of fluidized propellant passing to the combustion chamber. Thus, it is possible by manipulating the valve 17 to modulate or change the rate of combustion or to stop combustion of the solid propellant completely.

In cases where a single charge of propellant is to be used, such as in operating a certain component for a predetermined period of time, the fluidizing chamber is made sufficiently large to accommodate the desired amount of solid propellants. Where sustained combustion is desired, the solid propellant in the fluidizing chamber can be replenished from a source 18 by operation of a pump 19 of the displacement type which draws the propellant through line 20 and forces it into the fluidizing chamber 13.

Figure 6:
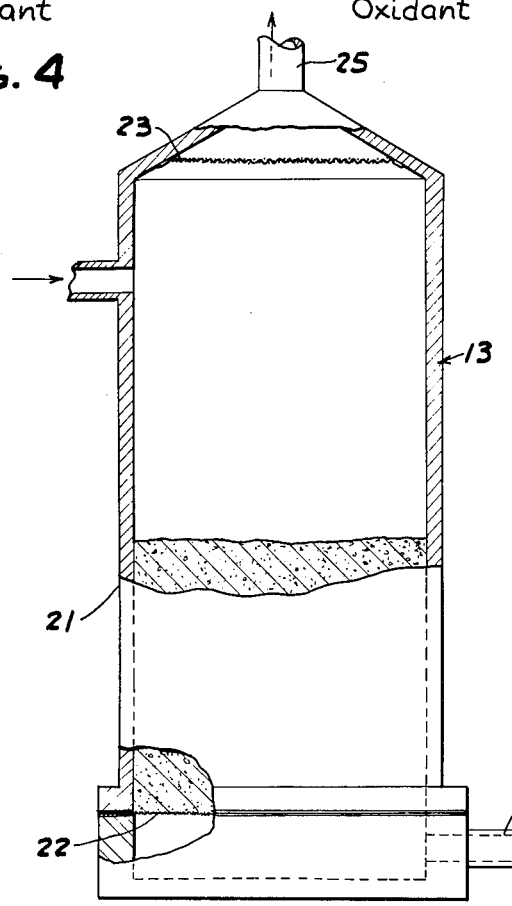
FIG. 6 is a part sectional view of a fluidizing chamber which may be used in the apparatus shown in FIGS. 1 and 3.

The fluidizing chamber 13 can be of any type which will operate to cause the propellant particles to be fluidized or suspended in a gas medium. For example, as shown in FIG. 6, chamber 13 comprises an upright hollow housing 21 having a pair of vertically spaced screens 22, 23 therein and a gas inlet 24 below screen 22 and a fluidized propellant outlet 25 above screen 23. The space between the screens 22, 23 is partially filled with powdered propellant and the gas under pressure is passed through inlet 24 upwardly through the mass of propellant, fluidizing the propellant and causing the fluidized propellant to be carried outwardly through the outlet 25.

The fluidizing gas can be inert or may partake in the combustion of solid propellants. For example, air, steam, ammonia and other gases can be used.

Where the propellant includes fuel and oxidant fluidized in the same chamber, the particles of fuel and oxidant should have the same velocity of free fall in order to maintain the proper ratio of fuel and oxidant in the fluidized state.

Figure 4:
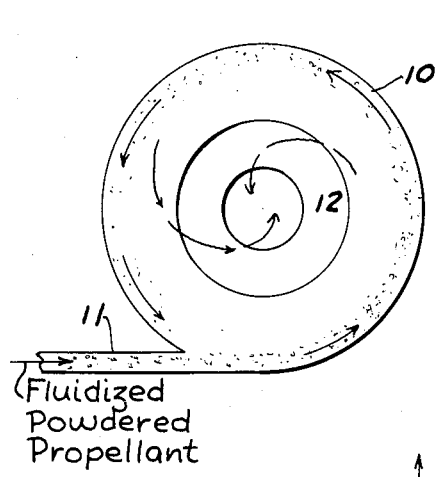
FIG. 4 is a cross sectional view of a combustion chamber used in the apparatus shown in FIGS. 1 and 3.

Combustion chamber 10 should be of the type which causes a circulation of the solid propellant therein to permit complete combustion of the propellant and at the same time, provide ignition of the propellant which is subsequently caused to enter the chamber so that the igniter need not be energized at all times. As shown in FIG. 4, the combustion chamber 10 is preferably cylindrical and has an axial length slightly greater than the diameter of inlet pipe 11. The tangential inlet 11 causes the fluidized propellant to enter and move circumferentially around the interior of the chamber 10. Circulation of the solid propellant continues until the particles of solid propellant are entirely consumed after which the combustion gases pass axially outwardly through the outlet 12. Centrifugal force causes the solid propellant particles to follow the interior surface of chamber 10 until they are entirely burned and become gases which gravitate to the center and pass axially outwardly through outlet 12.

Figure 2:
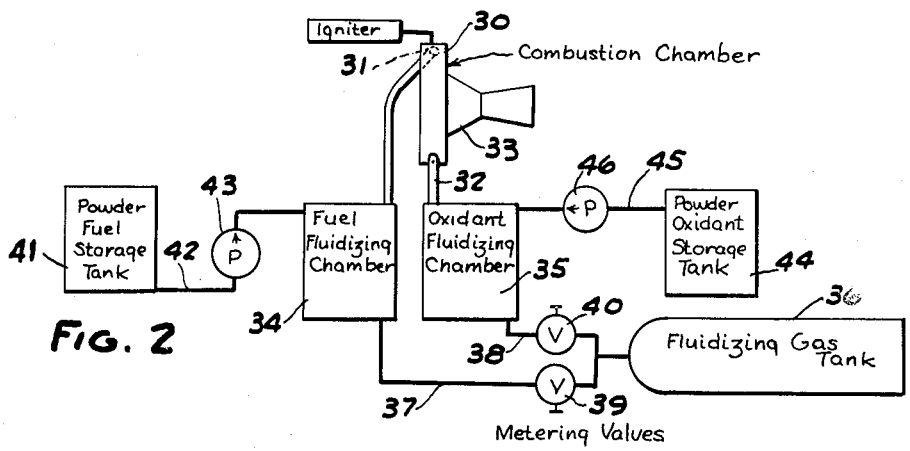
FIG. 2 is a diagrammatic view of a modified form of apparatus for controlling the combustion of solid propellants.

A modified form of apparatus is shown in FIG. 2 wherein combustion chamber 30 is provided with circumferentially spaced tangential inlets 31, 32 and axial outlet 33. Inlets 31, 32 are connected respectively to a fuel fluidizing chamber 34 and an oxidant fluidizing chamber 35 so that the fuel and oxidant are separately fluidized and separately introduced into combustion chamber 30 through inlets 31, 32. This may be desirable where the oxidant is relatively unstable in the presence of the fuel, as is the case with the more active oxidants. Fluidizing gas under pressure from a gas generator or tank 36 passes through lines 37, 38 to the fluidizing chambers 34, 35, respectively. Valves 39, 40 in the lines 37, 38, respectively, control the amount of gas passing to each of the chambers so that a controlled combustion can be obtained, the valve 39 varying and controlling the amount of fluidized fuel supplied to the combustion chamber and the valve 40 varying and controlling the amount of fluidized oxidant supplied to the combustion chamber 30. As in the previous form of the invention, the fluidizing chamber can be made of sufficient size to hold the required change of fuel or oxidant as the case may be or storage tanks and pumps may be provided for replenishing the supply of fuel and oxidant into the chambers. Specifically, a fuel storage tank 41 is connected to fluidizing chamber 34 by a line 42 and a displacement pump 43 in a line 42 may be operated periodically or continuously to replenish the fuel in the fluidizing chamber 34. In the same manner, an oxidant storage tank 44 is connected to the fluidizing chamber 35 by a line 45 and a pump 46 in a line 45 is operated periodically or continuously to replenish the oxidant in the fluidizing chamber 35.

Figure 5:
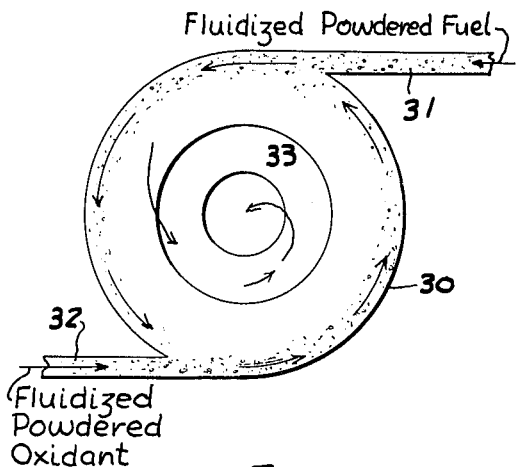
FIG. 5 is a diagrammatic sectional view of the combustion chamber used in the apparatus shown in FIG. 2.

Referring to FIG. 5, the combustion chamber 30 is constructed so that the inlets 31, 32 direct the fluidized oxidant and the fluidized fuel tangentially into the chamber in the same directions. In this manner, the fluidized fuel and fluidized oxidant are intimately mixed and burned and after being circulated, the combustion gases passing axially outwardly through outlet 33.

Instead of providing the fluidized fuel and fluidized oxidant separately to the combustion chamber 30, a separate premixing chamber constructed along the line of the combustion chamber 30 can be interposed between the fluidizing chambers 34, 35 and combustion chamber 30 to intimately mix the fluidized fuel and fluidized oxidant before they pass to the combustion chamber 30 of the type shown in FIG. 1 where the mixture is burned.

Figure 3:
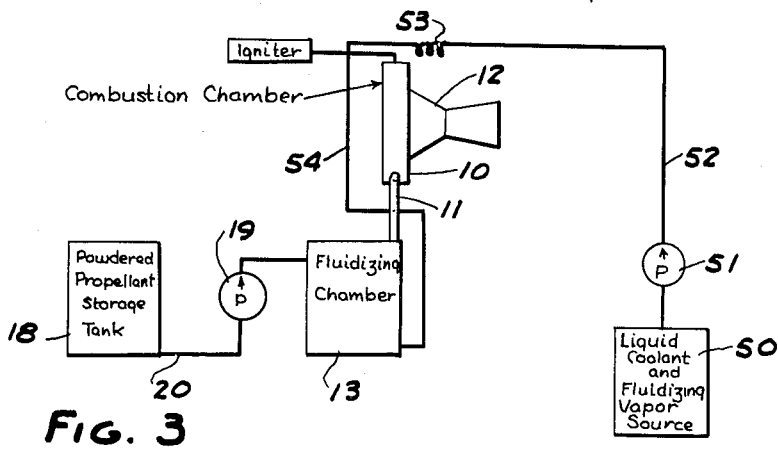
FIG. 3 is a diagrammatic view of a further modified form of apparatus for controlling the combustion of solid propellants.

Instead of providing a fluidizing gas source such as that shown in FIGS. 1 and 2, a volatile liquid can be used such as from source 50 in FIG. 3, the liquid being pumped by a pump 51 through a line 52 to a heat exchanger 53 adjacent combustion chamber 10 where it is vaporized, the gas thereafter passing through a line 54 to the fluidizing chamber 13 where the gas fluidizes the propellant and causes it to flow through the inlet 11 to the combustion chamber 10 where combustion takes place.

The combustion chamber shown in FIG. 5 can be used where one of the components is a solid and the other is a liquid. For example, where the fuel is liquid, such as kerosene, and the oxidant is solid, such as potassium perchlorate, the fuel would be sprayed under pressure or otherwise provided into inlet 32 and the oxidant, after being fluidized, would be introduced into inlet 31. Similarly, a solid fuel, such as rubber or urethane, and a liquid oxidant, such as liquid oxygen, can be used in an apparatus such as FIG. 5.

Obviously, where hypergolic propellants are used no igniter is required.

The solid propellant materials which can be used are of any conventional type which comprises a solid fuel and a solid oxidant. Successful results have been obtained by utilizing solid propellants manufactured by the American Rocket Company and identified as PF1 having an auto reaction temperature of 300–700° F., being non-toxic and containing an organic catalyst and PF2 having an auto reaction temperature of 300–500° F. and utilizing a chromium catalyst.

The term "fluidizing" as used herein is used in the generally accepted sense in the chemical engineering industry and is intended to mean the suspension of particles by moving a gas under pressure through a mass of particles. The particle size may vary, it being possible to fluidize particles as large as gunshot if the pressure of the gas is great enough. For purposes of this invention, powder propellant is preferred.

It can thus be seen that I have provided a novel method and apparatus for modulating, controlling and terminating combustion of solid propellant as desired.

I claim:

1. The method of providing controlled combustion of solid fuel and solid oxidant which comprises fluidizing and intimately mixing the powdered solid fuel and the powdered solid oxidant, either of said fluidizing or said mixing steps occurring first, introducing the fluidized powdered solid fuel and the fluidized powdered solid oxidant into a confined chamber, igniting said powdered solid fuel and powdered solid oxidant in said chamber, and controlling the rate of combustion by varying the amount of fluidized powdered solid fuel and fluidized powdered solid oxidant introduced into said confined chamber.

2. The method set forth in claim 1 wherein said fluidizing is achieved by passing a gas through the powdered solid fuel and the powdered solid oxidant.

3. The method set forth in claim 2 wherein said control of the rate of combustion is achieved by varying the rate of flow of fluidized gas through the powdered solid fuel and the powdered solid oxidant.

4. The method set forth in claim 1 wherein said step of intimately mixing the powdered solid fuel and powdered solid oxidant is performed externally of the chamber prior to fluidizing.

5. The method set forth in claim 1 wherein the powdered solid fuel and powdered solid oxidant are fluidized separately, and the step of intimately mixing the fluidized powdered solid fuel and powdered solid oxidant is performed within the chamber.

6. The method set forth in claim 1 including the steps of moving a volatile liquid into heat exchange relationship with said confined chamber to thereby volatilize said liquid into a gas, and utilizing said gas to fluidize the powdered solid fuel and the powdered solid oxidant.

7. An apparatus for providing a modulated and controlled combustion of solid propellant comprising solid fuel and solid oxidant which comprises a combustion chamber, means for fluidizing the solid powdered propellant comprising powdered solid fuel and powdered solid oxidant, and means for introducing said fluidized powdered propellant in a tangential direction to said combustion chamber, said combustion chamber having at least one axial outlet, ignition means for initially igniting the solid propellant within the combustion chamber, whereby said solid propellant upon entering said chamber is ignited by the recirculation of the prior ignited solid propellant and continues to recirculate until consumed by combustion whereafter the combustion products pass axially outwardly from said chamber through said axial outlet, and means for controlling the combustion by controlling the degree of fluidizing of said powdered solid propellant, said means for fluidizing said solid propellant comprising a fluidizing chamber individual to each of said powdered solid fuel and powdered solid oxidant components of the solid propellant, and means for directing gas individually to each of said fluidizing chambers, said means for controlling the combustion comprising means controlling the flow of gas through each said fluidizing chamber.

References Cited by the Examiner

UNITED STATES PATENTS

| | | | |
|---|---|---|---|
| 710,130 | 9/1902 | Weiss | 60—39.48 |
| 1,180,792 | 4/1916 | Norrman | 110—28 |
| 1,390,974 | 9/1921 | Von Porat. | |
| 2,635,564 | 4/1953 | Havemann | 110—28 |
| 2,792,262 | 5/1957 | Hathorn. | |
| 3,045,424 | 7/1962 | Morrell | 60—39.02 |

MARK NEWMAN, *Primary Examiner.*

SAMUEL LEVINE, *Examiner.*

D. HART, *Assistant Examiner.*